Nov. 18, 1930. C. B. BAILEY 1,782,087
GASKET
Original Filed May 7, 1926
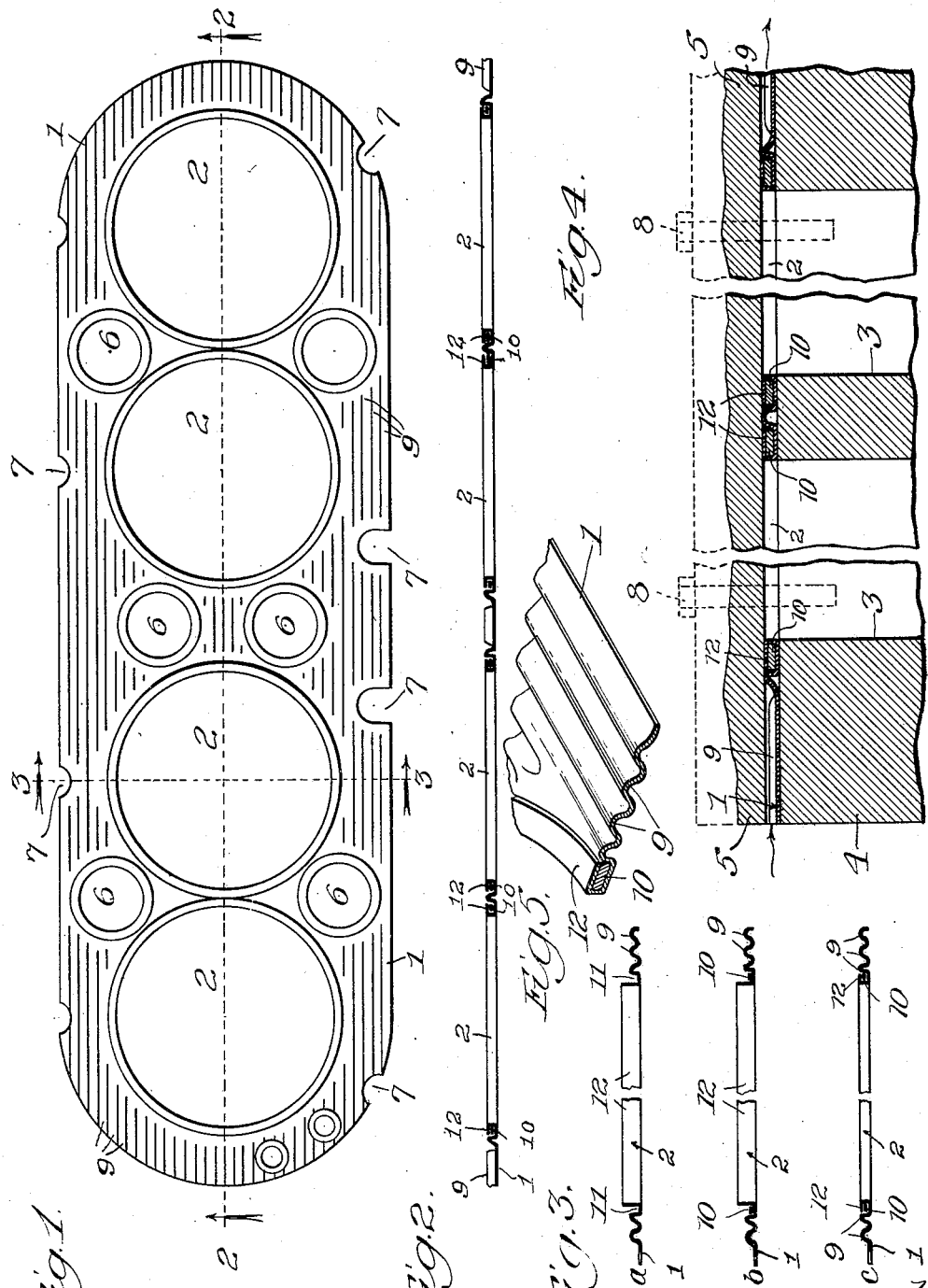
Inventor,
Claude B. Bailey,
By Eugene Ewans
Att'y Patented Nov. 18, 1930

1,782,087

UNITED STATES PATENT OFFICE

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE

GASKET

Application filed May 7, 1926, Serial No. 107,323. Renewed January 11, 1929.

In my copending application Serial No. 31,483, filed May 20, 1925, I have disclosed and claimed a cylinder-head gasket having a body portion consisting of a single layer of sheet metal, such as copper, brass, aluminum, zinc, etc., with means carried by the layer immediately about the respective holes or openings therein to receive the pressure exerted on the gasket when clamped between a cylinder block and head and make gas-tight joints between said parts.

The present invention has reference to a gasket of the kind referred to and has for its object to stiffen the body layer of the gasket against bending and distortion, by providing the body layer with corrugations between and about the openings in the gasket.

A further object of my invention is to employ the channels afforded by the corrugations as means permitting air to circulate between opposed surfaces of the cylinder block and head and thus aid in cooling the same.

The invention consists further in the matters hereinafter described and claimed.

In the accompanying drawings—

Fig. 1 is a top plan view of a cylinder-head gasket constructed in accordance with my invention;

Fig. 2 is a longitudinal sectional view taken through the gasket on line 2—2 of Fig. 1;

Fig. 3 is a transverse sectional view on line 3—3 of Fig 1; the several views of Fig. 3 illustrating certain steps employed in making the gasket;

Fig. 4 is an enlarged vertical sectional view showing the gasket clamped between a cylinder block and head of an internal combustion engine; and Fig. 5 is a perspective view of the corrugations to be hereinafter more fully referred to.

As shown in the drawings, the gasket has a body portion consisting of a single layer 1 of sheet metal, such as copper, brass aluminum, zinc, etc. The gasket when of the cylinder-head type has a plurality of relatively large holes or openings 2, 2 formed in the layer 1 and disposed in a row lengthwise thereof, as shown. The holes 2, 2 are of a size and shape to fit about the cylinder bores 3, 3 in an engine block 4 and against which the gasket is clamped by a cylinder head 5, as suggested in Fig. 4. As shown in Fig. 1, the layer 1 is further provided with a plurality of smaller holes 6, 6 of a size and shape to fit about the registering water passages in the engine block 4 and head 5, respectively, as in gaskets of this general character.

The layer 1 is provided about its margins with a plurality of notches 7, 7 to receive the bolts or studs 8 employed for clamping the head 5 to the block 4, as suggested in Fig. 4, said notches being arranged along the opposite side edges of the layer to conform with the stud arrangement for the particular installation for which the gasket is designed.

To stiffen the layer 1 against bending and distortion, I form a plurality of corrugations 9, 9 directly in the metal of the layer and extend them lengthwise of the same, as shown in the drawings and more particularly in Figs. 1 and 5. These corrugations are preferably parallel to each other and to the side edges of the layer 1, and are distributed over the entire surface of the layer between and about the holes 2 and 6 therein, as indicated in Fig. 1.

Due to the stiffening properties of the corrugations 9, the body of the gasket is made stiff enough to use a single layer of sheet metal for the purpose. This makes possible a cheaper and better gasket, as no excess material is required for stiffening purposes. With the corrugations, the layer 1 shows greater resistance to bending and distortion than the old style gasket of three layers of material, two outer layers of copper and an interposed layer of asbestos.

Means are provided about the respective holes 2, 6 to form the pressure receiving and joint sealing sections of the gasket, the corrugations forming no function in this regard. These sections may take the form of a plurality of superimposed layers of sheet metal, as covered by my copending application aforesaid; or they may be a combination of sheet metal and asbestos or like material, as shown in the present case. As herein illustrated, I provide asbestos or like rings 10, one about each of said holes, and which rings, in conjunction with the portion of the metal of the gasket layer 1 at the holes, form the cushions required to take the pressure exerted on the gasket at these holes when the gasket is clamped between a cylinder block and its head and also to make gas-tight joints between these parts about said holes.

To receive the rings 10, the layer 1 immediately about each hole is provided with an annular depression or pocket 11, as shown in Fig. 3 in view $a$. In making this pocket or depression, the metal of the layer 1 immediately around each hole is flanged up, as indicated at 12 in said view $a$. The ring 10 is then deposited in the pocket or depression, as shown in the view $b$ of Fig. 3, with the flange inside of the ring and covering the same. The flange 12 is then bent downward over the ring 10 so as to enclose the same, as shown in the view $c$ of Fig. 3.

By the construction just described, each ring 10 is completely concealed from view and protected from contact with the engine block and cylinder head 4, 5 and the explosions within the cylinder 3, as indicated in Fig. 4. The pocket 11 is higher than the corrugations 9, 9, as shown in Fig. 4. When the corrugations are flush with the under sides of the sections 10, 12, the gasket is supported on upper surface of the block 4 when the gasket is clamped against the same. This provides a space between the corrugations and the adjacent surface of the head so that air may circulate between the parts for cooling purposes. Moreover, the corrugations 9, 9 provide channels so that air may circulate freely through the gasket between the opposed surfaces of the block and the head to cool the same. The corrugations may extend through the end edges of the layer 1, so as not to close any of the channels to air flow. The corrugations in some gaskets would be arranged so as to permit a maximum of air circulation around exhaust ports of the motors for which those gaskets are designed.

The gasket shown in the drawings is coextensive with the opposed surfaces between which it is clamped. It is designed for use with a four-cylinder internal combustion engine with overhead valves, although of course the gasket may be designed for six or more cylinder motors and having other valve arrangements, without departing from the spirit and scope of my invention.

The details of structure shown and described may be variously changed and modified without departing from the spirit and scope of my invention, and the latter need not be limited to cylinder-head gaskets but may be applied to other automotive gaskets.

I claim as my invention:

1. A cylinder-head gasket having a body portion of a single layer of sheet metal with a plurality of openings therein, means carried by the body layer immediately about each of the openings to provide the pressure receiving and joint sealing sections of the gasket, and corrugations provided in the body layer entirely outside of said sections to stiffen the body layer against bending and distortion.

2. A cylinder-head gasket having a body portion of a single layer of sheet metal with a plurality of openings therein, the metal of the layer about each opening being formed to provide a pocket, an asbestos ring in each pocket and being encased by the metal of the layer about the opening, and corrugations formed in the layer outside of the rings to stiffen the layer against bending, said corrugations extending lengthwise of the body layer between the side edges thereof and parallel to each other and to said side edges with the corrugations terminating short of said pockets and rings.

3. A gasket comprising a body provided with a plurality of openings, reinforcing elements for the edges of said openings and a plurality of corrugations in the body of the gasket between adjacent openings.

In testimony whereof I affix my signature this 4th day of May, 1926.

CLAUDE B. BAILEY.